United States Patent [19]

Pierrou

[11] Patent Number: 5,320,135
[45] Date of Patent: Jun. 14, 1994

[54] FLOW COMPENSATOR VALVE

[75] Inventor: James R. Pierrou, Winamac, Ind.

[73] Assignee: The Braun Corporation, Winamac, Ind.

[21] Appl. No.: 953,894

[22] Filed: Sep. 30, 1992

[51] Int. Cl.⁵ ............... F16K 15/00; F16K 17/00; F15B 11/10
[52] U.S. Cl. ................... 137/513.3; 137/517; 91/433; 91/443
[58] Field of Search ............... 91/418, 433, 443, 449; 137/513.3, 517

[56] References Cited

U.S. PATENT DOCUMENTS

| 2,136,898 | 11/1938 | Thomas | 137/517 |
| 3,170,481 | 2/1965 | Presnell | 137/513.3 X |
| 4,932,435 | 6/1990 | Stroze et al. | 137/517 X |

FOREIGN PATENT DOCUMENTS

| 83403 | 7/1983 | European Pat. Off. | 137/513.3 |
| 332451 | 5/1919 | Fed. Rep. of Germany | 137/517 |
| 2231782 | 2/1973 | Fed. Rep. of Germany | 137/517 |

Primary Examiner—Edward K. Look
Assistant Examiner—John Ryznic
Attorney, Agent, or Firm—Jacques M. Dulin

[57] ABSTRACT

A flow compensator valve for use in a hydraulic system which includes a cylindrical body having inlet and outlet ports, and a slidable, spring-biased hollow piston insert disposed within a center bore of the body, which insert has a plurality of ports for flow control depending on the position of the insert as it reciprocates axially within the center bore of the valve body. In a preferred embodiment, the valve is used in connection with a hydraulically actuated lift which is particularly useful for assistance of handicap persons for vans and mass transit vehicles. The axially-reciprocable, spring-biased flow rate controlling insert has a small central axial bore for slow lift movement in the loaded condition and at least one larger transverse bore, which when exposed, permits flow therethrough for faster movement of the lift in the unloaded condition.

11 Claims, 3 Drawing Sheets

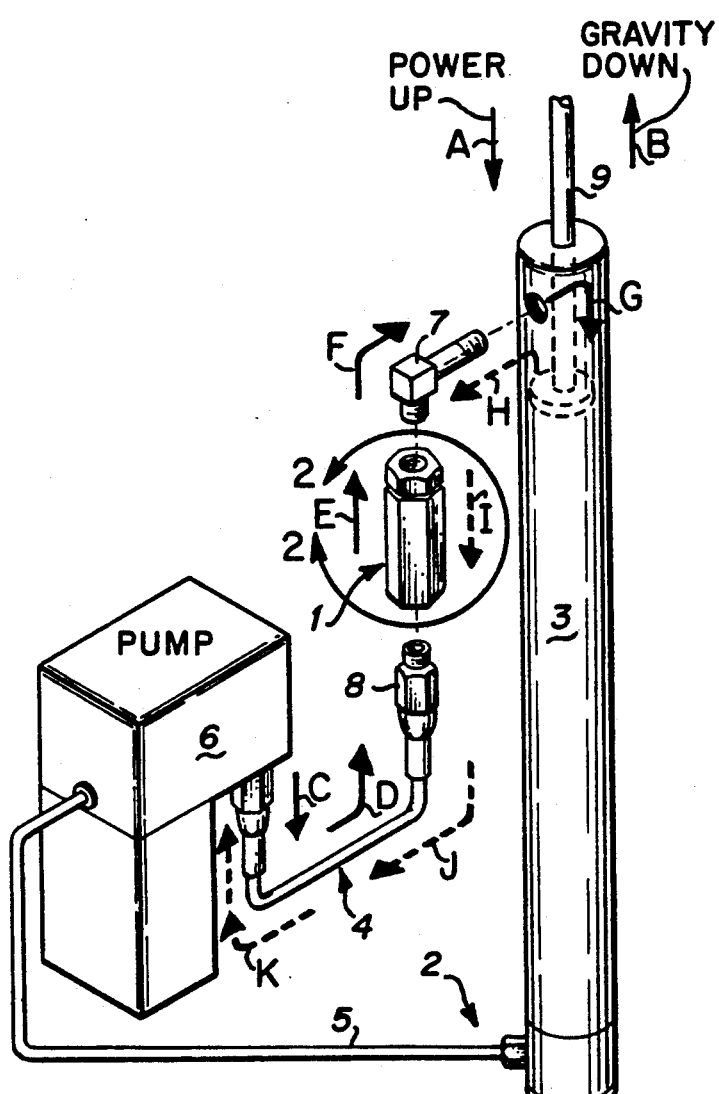
Fig_1
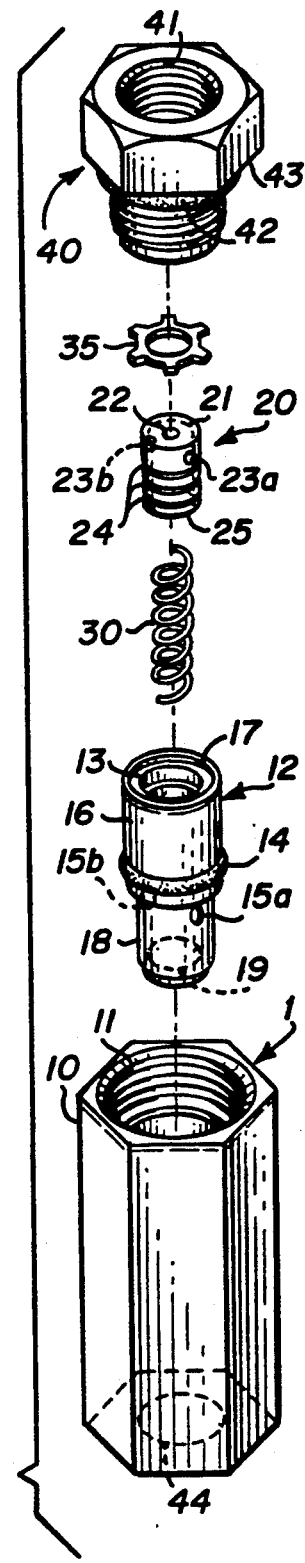
Fig_2

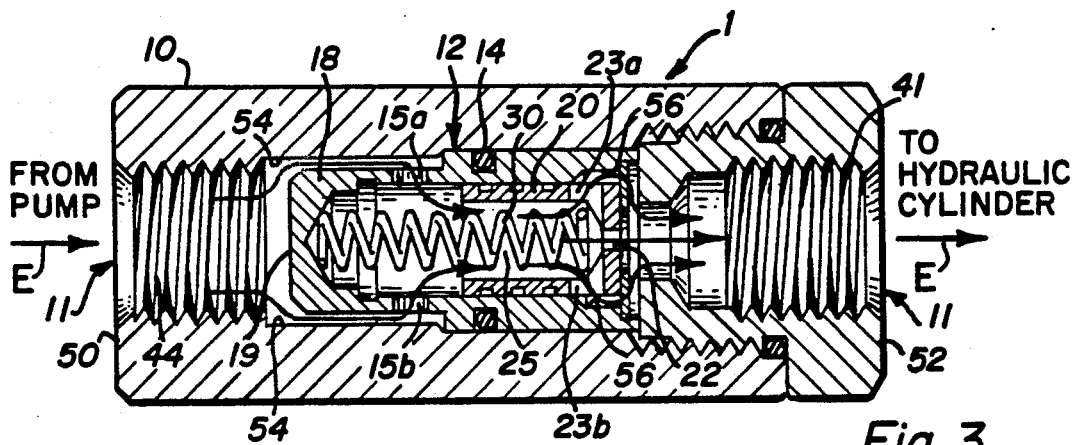
Fig_3
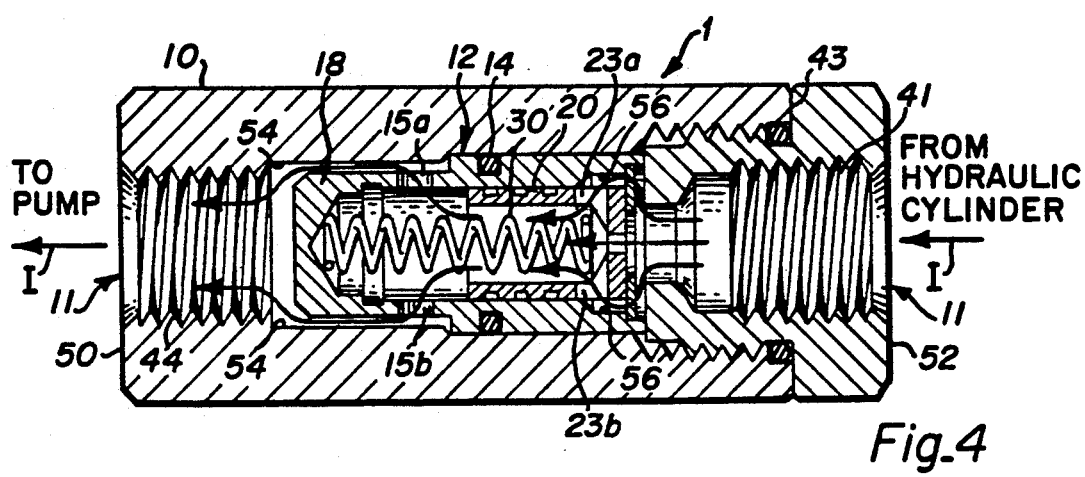
Fig_4
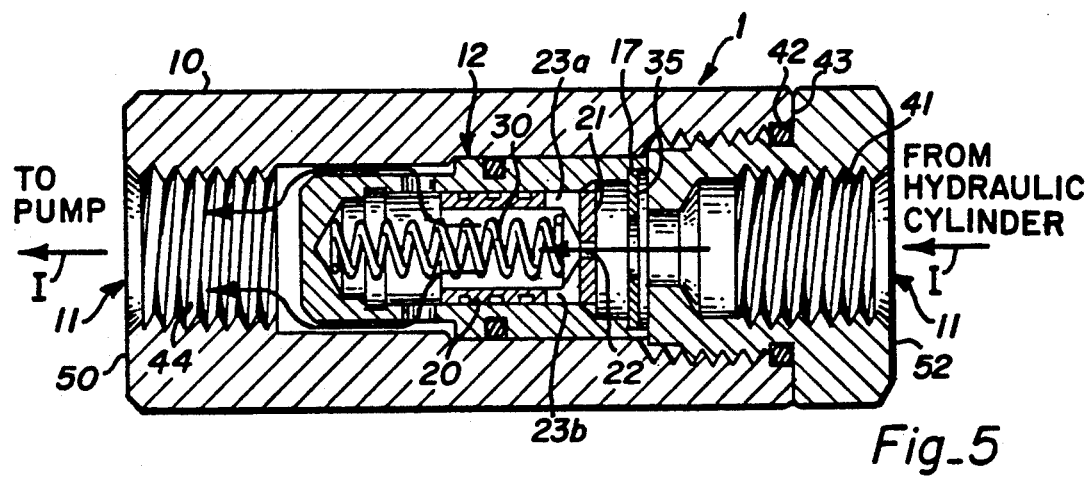
Fig_5

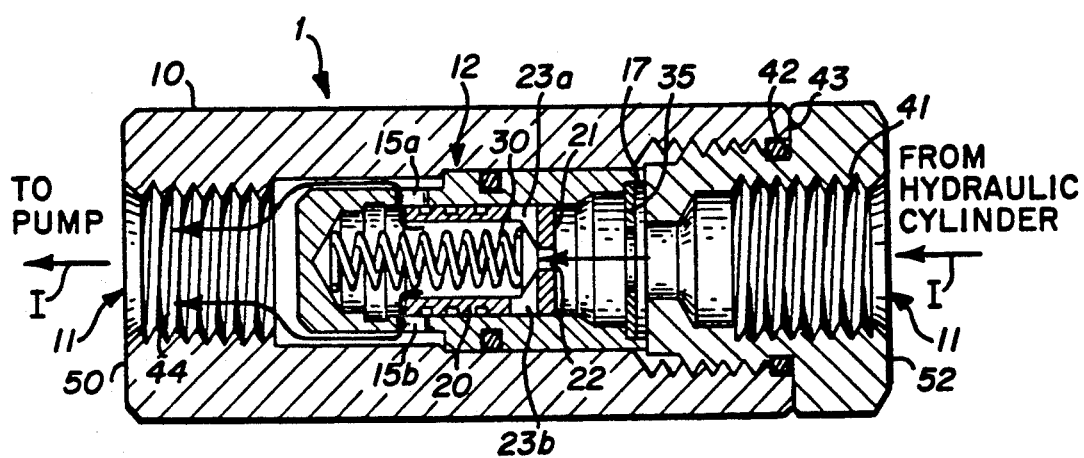
Fig_6

FLOW COMPENSATOR VALVE

FIELD

The present invention relates generally to hydraulic systems, and more particularly to flow compensator valves which permit variable rates of travel of hydraulic cylinder-actuated mechanical systems under differing load conditions. One principle application for the flow compensator valves is use in hydraulic platform lifts of the type having a gravity-down feature, in which the valves permit more rapid platform descents during an unloaded condition, thus cutting that portion of the descent/lift cycle time in half.

BACKGROUND

Hydraulic vehicle lifts have been in use for over 30 years. Examples of lifts are tailgate type lifts and handicap lifts. Many of these lifts are designed to be "gravity-down" which means that the valving is arranged such that there is no hydraulic pump activated in the cycle to pump hydraulic fluid into or out of the hydraulic cylinder during the descent portion of the use cycle. That is, the lift may descend from the vehicle floor (transfer) level to the ground in its loaded or unloaded condition by means of gravity, and not under the hydraulic pressure produced by the pump.

In a typical use cycle, taking a handicap lift-equipped vehicle for example, the vehicle will draw up to the user's stop. The vehicle doors will open, and the lift is deployed from the interior of the vehicle. In some instances, the lift platform may be stowed vertically, either inside the vehicle or externally of the vehicle. The internal vertical stowage is the current preferred system.

The lift platform first rotates downwardly to the horizontal from its vertical stowed position. The lift platform is then at the vehicle floor level, also called the transfer level. The lift is then permitted to descend by gravity to the ground. The total time of descent from transfer level to ground, unloaded and not under pump pressure takes typically 12-15 seconds with a conventional "monarch" valve. During both the deployment from stowed to transfer level and the subsequent descent to the ground level, the lift platform is normally unloaded for the case where passengers embark (enter) the vehicle. That is, there is no load weight being carried by the platform. Once the lift platform contacts the ground and any stop barriers are released, the handicap user may roll onto the lift platform. The lift is then powered by hydraulic pressure to raise the user up to the vehicle transfer level, the user rolls off the lift into the vehicle, and the platform is then stowed (raised) into its vertical position. The user-loaded lift from ground to transfer, and vice versa, must be slow, on the order of 20-30 seconds for safety and to be sure the passenger remains calm. The vehicle doors are closed and the vehicle then proceeds on its route or trip.

The problem is that during the unloaded descent phase the lift descends very slowly, not only from the initial vertical deployment to the transfer level but also and primarily from the transfer level to the ground level since there is no weight to create a driving force on the platform. A descent of 30-40 inches, which is typical for a lift employed with a van or transit bus, takes anywhere from 10-15 seconds at 65° F. for the unloaded descent, a rate on the order of 3 inches per second. In colder weather, the hydraulic oil or fluid thickens and results in noticeably slower descent times, on the order of 2 to 3 times longer.

In the case of transit vehicles, a slow, unloaded gravity-down descent constitutes a very substantial delay in boarding passengers. Since that delay occurs frequently but unpredictably during each trip, transit schedules are thrown off, and the number of trips that a given transit vehicle is capable of operating during any given shift or day is both unpredictable and substantially reduced. The only solution is to purchase additional vehicles, which may be an unaffordable expense for transit systems.

A safe speed for the loaded descent is on the order of 4-6 inches per second with 6" per second being the permitted maximum. The typical descent time for a conventional Monarch valve is 9.2 seconds at 60° F. with a load of from 400-600 lbs. While the unloaded descent cycle could theoretically be speeded up by providing larger flow valves, then the loaded descent, with a handicap person loaded on the platform on his or her wheelchair, would be frighteningly fast. In addition, a faster descent, which theoretically might be acceptable for certain handicap persons, others of differing age or frailty may not be able to cope with such a rapid descent. Since the lift must be universal, that type of a theoretical solution does not appear feasible.

Accordingly, there is a vital need in the art for improvement in lift cycles having varying speeds of lift ascent and descent: controlled, slow, loaded descent under power or by gravity (no power); controlled, slow, loaded, ascent; and unloaded fast descent, particularly for mass transit uses where a piece of highly expensive equipment (the transit vehicle) becomes captive to the rate of operation of just a small part of the equipment (the lift).

THE INVENTION

Objects

It is among the object of this invention to provide an improved valve system for hydraulic cylinders which permits different flow rates of hydraulic fluid through the valve in accordance with the presence or absence of back pressure exerted on the valve system.

It is another object of this invention to provide a fluid flow rate compensator valve for hydraulic cylinders which is particularly useful in lift mechanisms which permits a controlled lift or descent under load conditions, yet a differential, faster rate of descent or lift when the lift is in the unloaded condition.

It is another object of this invention to provide a hydraulic fluid flow valve having a spring-biased multi-position, movable insert having multiple ports which permit an increase volume of fluid flow through the valve during gravity down operation (i.e., when there is no back pressure exerted on the valve system).

Still other objects of this invention will be evident from the detailed description, drawings and claims of this case.

DRAWINGS

The invention is illustrated in more detail with respect to the drawings in which:

FIG. 1 is a schematic isometric view of a hydraulic cylinder and pump circuit showing fluid flow through the flow compensator valve of this invention;

FIG. 2 is an exploded view of the high flow compensator valve of this invention showing the assembly relationship of the individual parts of the valve;

FIG. 3 is an elevation view of the valve in partial cross section showing the piston (20) biased to the right during full pump pressure (full flow) to raise the platform under loaded or unloaded conditions (i.e., fluid flows in a direction from the pump to the hydraulic cylinder);

FIG. 4 is a partial cross section elevation view similar to FIG. 3 showing the valve with the piston (20) biased to the right to open the relief ports (23a, 23b) permitting full flow during the condition of no load on the platform in the gravity flow condition to lower the platform (i.e., where fluid flows from the hydraulic cylinder to the pump);

FIG. 5 is partial cross section elevation view similar to FIGS. 3-4 which shows the valve in the operating condition with a load on the platform where the piston is pushed by the force of hydraulic fluid pressure against the action of the spring so that the relief ports (23a, 23b) are closed (restricted or compensated flow) and FIG. 6 is a partial cross section elevation view similar to FIG. 5 which shows the valve in the operating condition with a load on the platform where the sleeve is pushed by the force of still greater hydraulic fluid pressure against the action of the spring so that the sleeve outlet ports (15a, 15b) are at least partially closed (restricted or compensated flow).

SUMMARY

The invention comprises a novel flow control valve in a hydraulic system, in which the valve includes a cylindrical body having inlet and outlet ports, and a slidable, spring-biased insert disposed in the body, which insert has a plurality of ports for flow control depending on the position of the insert as it reciprocates axially within the center bore of the valve body. In a preferred embodiment, the valve is used in connection with a hydraulically actuated lift which is particularly useful for assistance of handicap persons for vans and mass transit vehicles. The insert is preferably a hollow piston which fits within a sleeve. The axially-reciprocable, spring-biased flow rate controlling piston has a small central axial bore for slow lift movement in the loaded condition and at least one and preferably two larger transverse bore(s), which when exposed, permit flow therethrough for faster movement of the lift in the unloaded condition.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 shows in schematic fashion a preferred implementation of the flow compensator valve 1 of the present invention in use with a hydraulic cylinder and pump circuit 2. The pump circuit 2 includes a single-acting hydraulic cylinder 3 which is connected at both ends by a pair of hydraulic lines to a pump 6 including a rod side hydraulic line 4 and a piston side hydraulic line 5. The flow compensator valve 1 is disposed between the pump 6 and the rod side of the cylinder 3 in a pull type lift action, and connects to the rod side of the hydraulic cylinder 3 by connector fitting 7 which threadingly engages one side of the flow compensator valve. A second connector fitting 8 connects the other side of the flow compensator valve 1 to the rod side hydraulic line 4.

The exemplary hydraulic cylinder and pump circuit 2 is preferably used in a hydraulic wheelchair lift having gravity down operation. An example of a lift having pull-type hydraulic action is shown in commonly owned application of Goodrich et al., Ser. No. 07/825,625 filed Jan. 24, 1992, the specification of which is incorporated by reference herein to the extent necessary. To raise the lift, such as for example, from a first lowered position (i.e., from the ground or curb level) to a second raised position (i.e., the intermediate transfer level) hydraulic oil under pressure travels from the pump 6 through the rod side hydraulic line 4 where it then continues through the flow compensator valve and into the rod side of the hydraulic cylinder 3. This flow of fluid is indicated by direction arrows C, D, E, F and G.

Pressure on the rod side of the cylinder retracts the rod 9 into the cylinder 3 in the direction of arrow A and causes the platform lift to raise. Hydraulic fluid displaced in the cylinder travels through the piston side hydraulic line 5 into a reservoir of the pump assembly 6.

For gravity down operation, a conventional flow control (relief) valve (not shown) adjacent the pump is opened allowing hydraulic fluid to flow from the rod side of hydraulic cylinder 3 back through the flow compensator valve 1 and rod side hydraulic line 4 in the direction of arrows H, I, J and K. This extends the cylinder rod 9 out from the hydraulic cylinder 3.

For lowering operation under load (i.e., where a wheelchair user is on the lift platform), the flow of hydraulic oil through the flow compensator valve is maintained at a controlled steady rate. For descent of the platform when no load is present, an increased rate of oil flow through the flow compensator valve is permitted thus achieving faster descent times of the lift platform when unloaded.

With reference now to FIG. 2, the detail of the flow compensator valve 1 will be described. The flow compensator valve 1 comprises a valve body 10 (or housing), a sleeve 12, an open coil spring 30, a piston 20, a retainer 35, and a cap nut 40. The valve body 10 includes a bore hole 11 for receiving the insertion of the sleeve 12 therein. The sleeve 12 includes an upper sleeve portion 16 and a lower sleeve portion 18, between which is a groove holding an O-ring 14. The lower sleeve portion 18 is capped at the bottom end 19.

As is best seen in FIG. 2, the outer diameter of the lower sleeve portion 18 is less than the outer diameter of upper sleeve portion 16 and includes a plurality of outlet ports 15, preferably two (15a and 15b), for the entry and exit of hydraulic oil. The O-ring 14 provides a liquid tight seal to prevent oil surrounding the outer periphery of the lower sleeve portion 18 from moving past the inner sleeve insert 12 towards the upper sleeve portion 16. Note, in an alternate embodiment the sleeve 12 may be formed integral with the bore 11 of body or housing 10.

The spring 30 is received within a borehole 13 of tubular sleeve insert 12 and is constrained at one end by the bottom end wall 19 of the lower sleeve portion 18, and at its other end by the top end wall 21 of the piston 20. The tubular piston 20 includes an axial main port 22 disposed in its top end wall (or head end) 21, and a pair of 180° opposed relief ports 23a and 23b in its upper side wall periphery portion. The piston 20 also includes a plurality of fluid-retaining grooves 24 in its side wall to provide lubrication for movement and reduce sticking due to cocking. The piston 20 and spring 30 are retained within the sleeve, 12 by press-fit attachment of the retainer member 35 to the sleeve retainer recess 17, to complete the assembly. The cap nut 40, having an O-ring 42 adjacent the nut head shoulder 43 is threadingly engaged to the upper threaded portion of the bore hole 11 of the valve body 10. The cap nut 40 includes a threaded bore 41 for attachment to the connector fitting 7 (see FIG. 1) in the known way. Similarly, the bottom end of the valve body 10 includes a threaded borehole 44 (best seen in FIGS. 3–5) for connection to a standard connector fitting (i.e. fitting 8 of FIG. 1).

FIG. 3 is a partial cross-sectional view which shows flow of hydraulic oil through the flow compensator valve during a lifting operation of the platform with or without load on the platform (i.e., where the cylinder rod 9 moves in the direction of arrow of A of FIG. 1 and retracts into the hydraulic cylinder).

During this operation, the piston 20 is biased by the compression of spring 30 all the way to the right against retaining ring 35, thereby creating a maximum number of fluid outlet pathways (two ports 23a, 23b and one axial port 22) for fluid which enters the valve body 10 at the pump end 50 and exits at the hydraulic cylinder end 52. More specifically, hydraulic oil enters at the pump end 50 through bore hole 11 and travels in a pathway defined by the outer side wall of reduced radius lower sleeve portion 18 and the inner wall portion 54 of the bore hole 11 where the fluid then enters the hollow cavity or bore 13 of the sleeve 12 via ports 15a, 15b in the lower sleeve portion 18. The fluid continues its travel path through both the main port 22 and relief ports 23a, 23b of the piston 20 before exiting the bore hole 11 at the hydraulic cylinder end 52 of the valve body 10. As is evident from FIG. 3, the inner diameter of bore 11 of body 10 varies throughout its length and includes an increased diameter region 54 to permit flow of the oil around the lower sleeve portion side wall 18 and through ports 15a, 15b and an intermediate relief region 56 which permits full flow of oil through the piston cavity 25 via relief ports 23a, 23b in addition to the flow path through main port 22. In the preferred embodiment and for ease in manufacture, the intermediate relief region 56 is an enlarged inner diameter provided to the sleeve 12 (or bore 11 for the case where the sleeve also forms the bore 11).

Referring now to FIG. 4, the flow direction of hydraulic fluid through the compensator valve is reversed from right (hydraulic cylinder end 52) to left (pump end 50). The fluid is shown in a full flow condition corresponding to gravity down operation with no load on the platform. For gravity down operation, oil flow moves in the direction of arrow I where it enters the bore hole 11 at the hydraulic cylinder end 52 of the valve body 10 and flows through the axial main port 22 and around the piston head 21 through relief ports 23a, 23b into the central cavity or bore 25 of the piston 20. The fluid exits the sleeve 12 through the lower sleeve portion outlet ports 15a, 15b, the outer side wall of lower sleeve portion 18 and the valve body inner wall 54 until it eventually exits the bore 11 at the pump end 50 of the valve body 10. For gravity down operation (with no load), the spring 30 preferably has a spring constant sufficiently high to provide a spring force which overcomes the pressure force exerted on the piston head 21 by the hydraulic fluid. Since there is little or no back pressure during gravity down operation, the spring 30 remains extended and all ports are open, providing rapid descent in the unloaded condition.

FIG. 5 shows the flow of oil through the flow compensator valve 1 during the loaded condition, wherein an increased pressure is exerted on the piston head 21 sufficient to overcome the spring force. Spring 30 is compressed and is moved to the left, thus closing off the additional (full flow) fluid pathways of relief ports 23a, 23b. Thus, all the fluid flow is now restricted, being concentrated solely through the single main axial port 22, which causes the lift platform to descend at a slow steady rate.

In other words, during a loaded platform descent, fluid pressure induced by the load acts on the piston head 21 and once a threshold resistance force of the spring is overcome, the piston head 21 moves from right to left (as seen in FIG. 5) such that it retracts further within sleeve insert 12 and closes off fluid flow through ports 23a and 23b. The slower loaded descent provides safe operation for handicap users.

FIG. 6 is a partial cross section elevation view similar to FIG. 5 which shows the valve in the operating condition with a load on the platform where the sleeve is pushed by the force of still greater hydraulic fluid pressure against the action of the spring so that the sleeve outlet ports (15a, 15b) are at least partially closed (restricted or compensated flow).

COMPARATIVE EXAMPLE

In operation using the flow compensator valve 1 of this invention under normal operating hydraulic oil temperatures (i.e., 65° Farenheight), the rate of descent of an unloaded platform is on the order of 7.54 seconds for a 40" drop. This is approximately twice as fast as compared to a conventional Monarch flow valve which takes 13.9 seconds to drop the same distance at 60° F. when substituted in the hydraulic circuit of the same lift.

In addition, improved results (i.e., faster unloaded descent times) were achieved during all ranges of temperature, including cold average oil operating temperatures. For the same lift, the times for a 40" unloaded drop ranged from 13.09 seconds at 20° F. hydraulic fluid temperature to 5.62 seconds at 123° F.

For a loaded drop, the flow compensator valve of this invention resulted in a 40" drop in 8.24 seconds (4.9" per second) at 65° F. under a 400 lb. load, and 8.12 seconds (5.0" per second) at 65° F. under a 600 lb. load. This is well within the maximum allowable descent rate of 6" per second. By comparison the standard Monarch valve, which does not have the reciprocating piston insert mechanism of this invention, provides a 9.2 second drop at 60° F. for both 400 lb. and 600 lb. loadings (4.35" per second). For the valve of this invention, under both 400 and 600 lb. loads dropping under pump pressure or by gravity results in drop times and descent rates of from 10.52 seconds (3.8" per second) at 20° F. to 7.43 seconds (5.4" per second) at 123° F. It is important that the loaded gravity drop is also slow, as this represents manual operation or pump failure conditions, a further and very significant safety feature. This is achieved by selecting the spring to have a compression threshold below the pressure produced by the load.

The loaded and unloaded ascent times for the valve of this invention are substantially the same as the loaded and unloaded ascent times achieved by the standard Monarch valve for typical platform loads ranging from 0–600 lbs (20 to 40 seconds on average). The fluid pressure required to raise a light load of 43 lbs. ranges from 900 PSI at 20° F. to 750 PSI at 123° F. The fluid pressure required to raise a heavy load of 600 lbs. ranges from 2200 PSI at 20° F. to 2100 PSI at 123° F.

The result is that the valve of this invention selectively reduces the unloaded descent time while not substantially affecting the time for loaded lift or loaded descent (gravity or pump pressure).

It should be understood that various modifications within the scope of this invention can be made by one of ordinary skill in the art without departing from the spirit thereof. For example, the valve and pump circuit could be reversed for a push type hydraulic cylinder arrangement. That is, the connection of lines 4 and 5 to the hydraulic cylinder would be reversed in FIG. 1. Likewise, the arrangement of the spring may be reversed, an expansion (closed coil) spring may be used, or dual springs of differing spring ratios with one on each side of the piston insert face may be used. I therefore wish my invention to be defined by the scope of the appended claims in view of the specification as broadly as the prior art will permit.

PARTS LIST

1. Flow Compensator Valve
2. Pump Circuit
3. Hydraulic Cylinder (lift)
4. Rod Side Hydraulic Lines
5. Piston Side Hydraulic Lines
6. Pump
7. Fitting
8. Fitting
9. Cylinder Rod 9
10. FCV Body
11. Bore in Body
12. Sleeve
13. Bore in Sleeve
14. O-Ring
15. Outlet Port
16. Upper Sleeve Portion
17. Retaining Ring Recess
18. Lower Sleeve Portion
19. Closed Bottom End
20. Piston
21. Closed End (Head End)
22. Main Port
23. Relief Port
24. Grooves
25. Piston Cavity
26.
27.
28.
29.
30. Open Coil Compression Spring
   Arrow
A Rod Retraction During Lifting
B Rod Extension During Lowering
C-E Fluid Flow During Lifting
F-I Fluid Flow During Descent
35. Retaining Ring
36.
37.
38.
39.
40. Cap Nut
41. Threaded Bore in Cap Nut PARTS LIST -continued 42. O-Ring
43. Shoulder of Cap Net
44. Threaded Bore in Body
50. Pump End
52. Hydraulic Cylinder End
54. Inner Wall
56. Enlarged Diameter Portion

I claim:

1. A hydraulic compensator valve assembly for a hydraulic system enabling hydraulically-actuated motion of members, comprising in operative combination;
   a) a housing having an inlet and an exit port, and a generally cylindrical central bore;
   b) a generally tubular sleeve insert disposed in said center bore, said sleeve insert includes a first closed end, at least one sleeve port disposed adjacent to said closed end to permit flow of fluid therethrough, and a second open end;
   c) a hollow piston of generally tubular configuration having a cylindrical side wall and at least one end wall defining a piston head end portion, said piston reciprocatingly disposed within the bore of said sleeve insert wherein:
      i) said end wall has at least one port therethrough to permit passage of hydraulic fluid at a controlled rate;
      ii) said piston has at least one port disposed in said side wall, said side wall port providing additional flow therethrough of hydraulic fluid when exposed;
   d) said piston is received within said open end of said sleeve and is disposed to reciprocate therewithin;
   e) said sleeve includes a first relief portion disposed along an inner wall adjacent said piston head and portion such that said side wall port of said piston is selectively exposed to permit varying rates of fluid flow through said piston as said piston is reciprocated between said first and second positions;
   f) said valve assembly including a second relief portion between said sleeve and said housing disposed in communication with said sleeve port to permit flow of hydraulic fluid through said sleeve port;
   g) means for biasing said piston within said sleeve insert so that said sidewall port of said piston is in a preselected open or closed position;
   h) the bore of said sleeve in cooperation with said piston closes said side wall port of said piston when said piston is in a first position, and opens said sidewall port of said piston, when said piston is in a second position, upon movement into said second position, to permit different rates of flow of hydraulic fluid to pass through said compensator valve for hydraulically-actuated motion of said members at differential rates depending on the pressure in the hydraulic system;
   i) said second relief portion permits varying rates of fluid flow through said sleeve port as said piston is reciprocated between said first and second positions; and
   j) said biasing means is selected to move said piston to an open position of said piston side wall port during a first, low back pressure condition, but yieldingly permits a slidable movement of said piston to close said piston side wall port upon reaching a threshold pressure level during a second, higher back pressure condition, and to at least partially close said sleeve port upon further application of a third, higher back pressure condition.

2. A hydraulic compensator valve as in claim 1 wherein said biasing means is a compression spring.

3. A hydraulic compensator valve as in claim 2 which includes:
   a) means for preventing fluid flow between an outer periphery portion of said sleeve insert and said central bore.

4. A hydraulic compensator valve as in claim 3 wherein said means for preventing fluid flow is an O-ring.

5. A hydraulic compensator valve as in claim 4 which includes a retainer ring for retaining said piston within said sleeve open end.

6. A hydraulic compensator valve for a hydraulic system including hydraulically actuated motion in an assembly, comprising in operative combination;
   a) a housing having an inlet and an exit port, and a generally cylindrical central bore, said housing central bore includes opposed end openings having means for connection to upstream and downstream hydraulic line elements;
   b) a hollow piston of generally tubular configuration having a cylindrical side wall and at least one end wall defining a piston head end portion, said piston reciprocatingly disposed within the bore of said housing wherein:
      i) said end wall has at least one port therethrough to permit passage of hydraulic fluid at a controlled rate;
      ii) said piston has at least one port disposed in said side wall, said side wall port providing additional flow therethrough of hydraulic fluid when exposed;
   c) means for biasing said piston within said housing so that said cylindrical sidewall port is in a preselected open or closed position;
   d) the bore of said housing in cooperation with the piston closes said side wall port when said piston is in a first position, and opens said sidewall port when said piston is in a second position upon movement into said second position to permit different rates of flow of hydraulic fluid to pass through said compensator valve for hydraulically-actuated motion of said assembly at differential rates depending on the pressure in the hydraulic system;
   e) said housing central bore includes relief portions disposed along an inner wall adjacent said piston side wall such that said side wall port of said piston is selectively exposed to permit varying rates of fluid flow through said piston as said piston is reciprocated between said first and second positions;
   f) said biasing means is selected to move said piston to an open position of said piston side wall port during a first, low back pressure condition, but yieldingly permits a slidable movement of said insert to close said piston side wall port upon reaching a threshold pressure level during a second, higher back pressure condition;
   g) a generally tubular sleeve insert disposed in said center bore, said sleeve insert includes a first closed end, at least one sleeve port disposed adjacent said closed end to permit flow of fluid therethrough, and a second open end;
   h) said piston is received within said open end of said sleeve and is disposed to reciprocate therewithin; and
   i) said sleeve includes relief portions disposed along an inner wall adjacent said piston side wall such that said side wall port of said piston is selectively exposed to permit varying rates of fluid flow through said piston as said piston is reciprocated between said first and second positions.

7. A hydraulic compensator valve as in claim 1 wherein said biasing means is selected to move said piston to an open position of said side wall port during a first, low back pressure condition, but yieldingly permits a slidable movement of said insert to close said port upon reaching a threshold pressure level during a second, higher back pressure condition.

8. A hydraulic compensator valve as in claim 7 wherein said biasing means is a compression spring.

9. A hydraulic compensator valve as in claim 8 which includes:
   a) means for preventing fluid flow between an outer periphery portion of said sleeve insert and said central bore.

10. A hydraulic compensator valve as in claim 9 wherein said means for preventing fluid flow is an O-ring.

11. A hydraulic compensator valve as in claim 10 which includes a retainer ring for retaining said piston within said sleeve open end.

* * * * *